J. A. PRINDLE.
Beer-Pump Valve.
No. 206,825.      Patented Aug. 6, 1878.
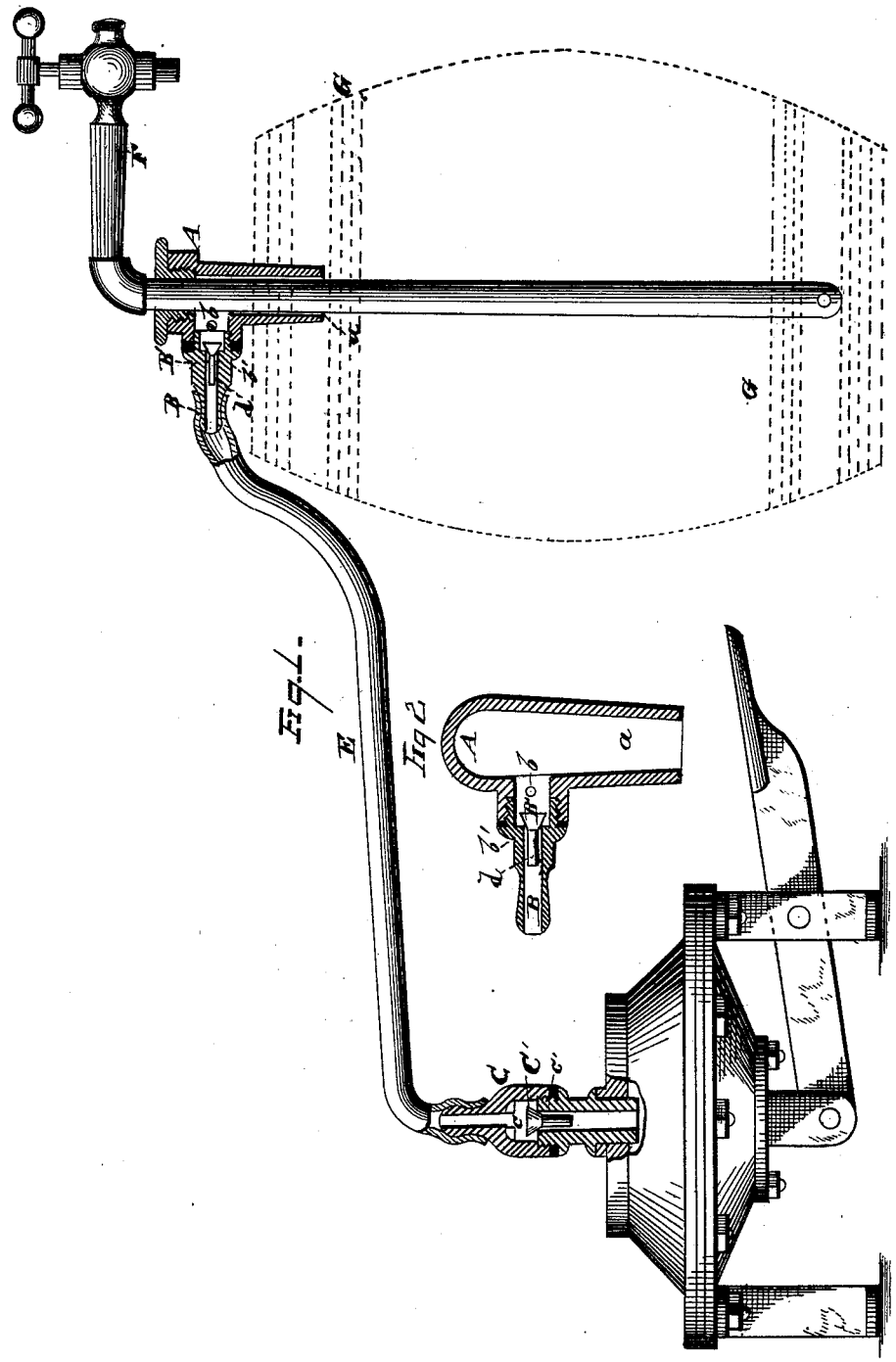
WITNESSES
Ed. J. Nottingham
A. W. Bright
INVENTOR
John A. Prindle.
By Leggett and Leggett.
ATTORNEYS

UNITED STATES PATENT OFFICE.

JOHN A. PRINDLE, OF CLEVELAND, OHIO.

IMPROVEMENT IN BEER-PUMP VALVES.

Specification forming part of Letters Patent No. 206,825, dated August 6, 1878; application filed January 14, 1878.

*To all whom it may concern:*

Be it known that I, JOHN A. PRINDLE, of Cleveland, in the county of Cuyahoga and State of Ohio, have invented certain new and useful Improvements in Apparatus for Pumping Liquids from Casks; and I do hereby declare the following to be a full, clear, and exact description of the invention, such as will enable others skilled in the art to which it pertains to make and use it, reference being had to the accompanying drawings, which form part of this specification.

My invention relates to an apparatus for pumping fluids from casks, and is intended as an improvement on the device shown and described in Letters Patent No. 191,656, dated February 6, 1877, granted to Wm. F. Class.

My improvement consists, principally, in the peculiar construction of the bung, provided with valve or valves, which close the bunghole hermetically and automatically by the pressure of gas from within, while air or gases may be easily forced through it into the cask, barrel, or other vessel.

It also consists in constructing the airvalve proper of rubber or equivalent elastic material, forming it conical or conoidal, and causing it to rest upon a sharp-edged seat, whereby slight pressure will be sufficient to insure good results, and heavy pressure the same results, without liability of damaging the valve.

In the accompanying drawings, which form a part of my specification, Figure 1 represents a general view of my whole apparatus, showing parts in section. Fig. 2 represents a bung having a closed imperforate top, and adapted to be inserted in a barrel in the ordinary manner.

In the drawings, A represents a common bung, made of any suitable material, with an opening, *a*. B represents a detachable nozzle, to be fastened to the bung in any suitable manner. B' represents a valve, made of rubber or any other elastic substance, in form as represented in B'. This peculiar form is superior to any other, as it is forcibly kept in its proper place, being prevented from passing from the bung by the shoulder *b'* in the nozzle B, and cannot be forced back into the cask or barrel, being prevented by the pin or other obstruction.

An ordinary close-top bung may be provided with my improvement, as clearly illustrated in Fig. 2, wherein the parts are designated by the same letters employed to designate like parts in Fig. 1.

The operation of my invention is as follows: The bung A, having been inserted in a barrel, cask, or other vessel, G, from which the liquid is to be drawn, is connected with the pump D by a flexible hose attached to the nozzles B and C. As the air is forced from the pump into the nozzle C the valve C' is forced up against the obstruction *c* in the nozzle C, thereby allowing the free passage of air to the tube or hose E, and from thence to the nozzle B, when the operation of the valve B' is the same as that of C', as described. Being forced back against the obstruction *b*, the air passes readily into the barrel or cask, forcing the liquid out through the faucet F or other opening.

As soon as the pressure is withdrawn from the pump the air or gases within the barrel or cask force back the valves B' and C' to their seats *b'* and *c'*, thus preventing the escape of any gaseous or other matter from the casks.

The use of this pump and bung serves to keep the beer or other liquid entirely fresh until the last is drawn from the barrel. None of the gases with which the liquid may be impregnated can possibly escape.

It will be observed that the valves B' and C' are perfectly free valves, disconnected with all other parts of the device. This is very desirable, inasmuch as they are free to find a more rigid bearing in their seat, and, being free, they are almost sure to find a slightly-different bearing every successive time that they are forced against their seat, when, as if they were connected with any adjacent part, so as always to find the same seat, they would soon wear so as to leak gas about their seats. The central stem, *d*, insures that the valves shall always be directed to a square bearing against their seats, and never be liable to lodge at one side, and consequently to leave the valve more or less open. The valves being removable by simply taking off the nozzles, they can be readily replaced when worn, or repaired when clogged or otherwise out of order.

Instead of the usual counter-shaped valveseat, such as is generally employed in connection with conical or conoidal valves, I provide a tolerably sharp-edged seat for said valves, which, by offering a sharper impingement against the elastic material of which the valve is composed, insures such intimate union of the two as to effectually prevent the passage or escape of air or gas in the wrong direction.

I am aware that conical valves very similar in fashion to my own are common; but in the first place they have not been, to my knowledge, made from rubber or elastic material, and in the second place the seats of such valves have been conically counter-shaped, and not constructed to offer a sharp or acute impinging seat to said valves. This peculiar combination of a free elastic conical or conoidal valve and a sharp or acute seat for the same effects a new and important result, to wit: a certainty of perfect operation at very low pressure, and an equal certainty of operation without danger of injury to the device at a high pressure.

So far as concerns the guiding-stem of the valve, it may either be made from the same material of which the valve proper is composed, or it may be metal or any other suitable material, upon which is cast or affixed the conical valve proper. This stem, as has already been specified, only serves the purpose of a guide, to insure at all times an accurate presentation of the valve to its seat; otherwise it might, at times, be liable to rest in such a manner as to allow a leakage.

Having thus described my invention, I claim as new and desire to secure by Letters Patent—

1. The combination, with a bung constructed with a screw-threaded opening on its side, and provided with a stop-pin secured in close proximity to said opening, of a detachable nozzle having an independent valve located therein, the head and stem of said valve being formed of elastic material, substantially as specified.

2. A conical or conoidal valve, B', constructed from elastic material, in combination with a sharp or acutely-impinging valve-seat, substantially as shown and specified.

In testimony whereof I have signed my name to this specification in the presence of two subscribing witnesses.

JOHN A. PRINDLE.

Witnesses:
F. TOUMEY,
W. E. DONNELLY.